United States Patent [19]
McLaughlin

[11] 3,943,750
[45] Mar. 16, 1976

[54] PROBE COLLECTOR FOR SUBTERRANEAN GASES

[75] Inventor: Jack E. McLaughlin, Yuba City, Calif.

[73] Assignee: Andermac, Inc., Yuba City, Calif.

[22] Filed: Dec. 13, 1974

[21] Appl. No.: 532,669

[52] U.S. Cl............... 73/23; 23/232 R; 73/421.5 R; 73/432 R
[51] Int. Cl.².......................................... G01V 9/00
[58] Field of Search......... 73/421.5 R, 23 R, 432 R; 23/232 R

[56] References Cited
UNITED STATES PATENTS

| | | | |
|---|---|---|---|
| 2,141,261 | 12/1938 | Clark | 73/421.5 R |
| 3,835,710 | 9/1974 | Pogorski | 73/421.5 R |

*Primary Examiner*—S. Clement Swisher
*Attorney, Agent, or Firm*—Townsend and Townsend

[57] ABSTRACT

A gas probe for penetrating the earth to sample gasses therefrom such as gases of putrefaction in a suspected burial area. A cylindrical sampling conduit extends from an outlet at the top to a sampling manifold having at least one outwardly opening at the bottom and is affixed to a pike at its lower end which is the earth piercing portion of the probe. The sampling manifold is surrounded by a sleeve having a sealing bushing and a cylindrical section the same size as the pike. The reciprocating sleeve at the bushing seals the sampling manifold and applies pressure to the pike to force insertion of the probe. When the probe is driven to its full depth, the reciprocating sleeve is withdrawn to expose the sampling manifold. Withdrawal of this sleeve defines a protected annulus for the manifold openings simultaneously creating a gradually expanding volume which draws gases from the surrounding soil for sampling. The probe is particularly useful in verifying the presence or absence of a body in a suspected surreptitious burial site without excavation. The earth in an area suspected of being above a putrefying body. The probe, forms when the reciprocating sleeve is partially withdrawn, a chamber having a pressure gradient, so that vapors from the surrounding earth may be withdrawn and analyzed for gases appropriate to the detection of putrefaction.

2 Claims, 5 Drawing Figures

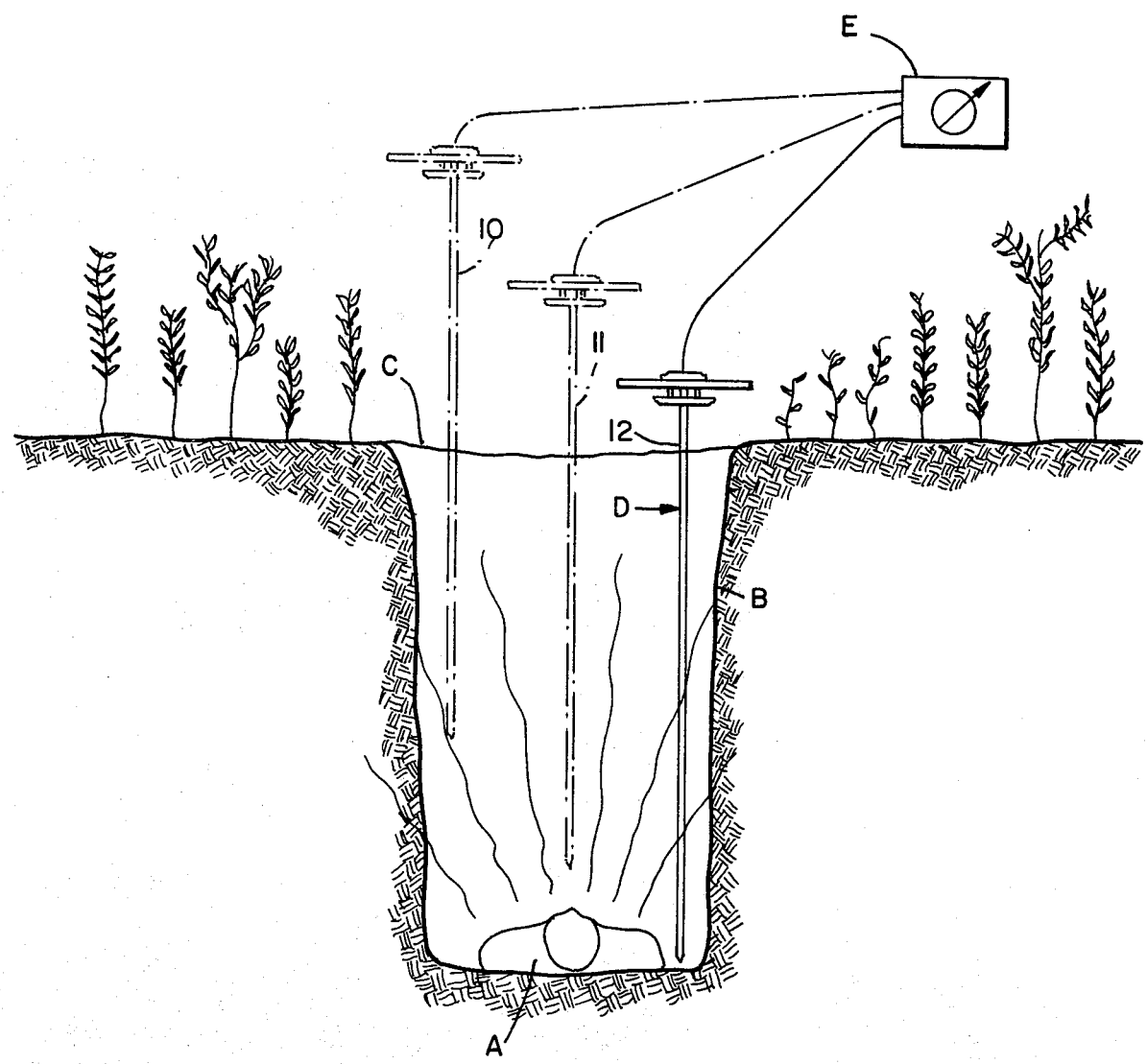
FIG_1

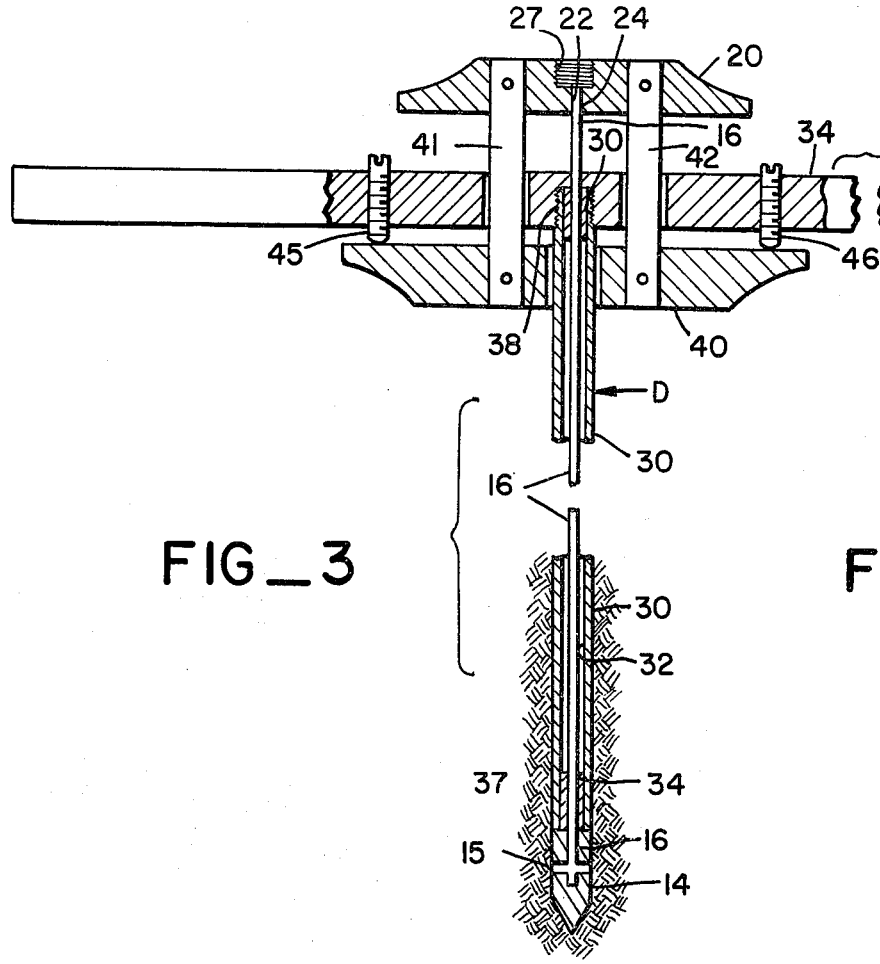
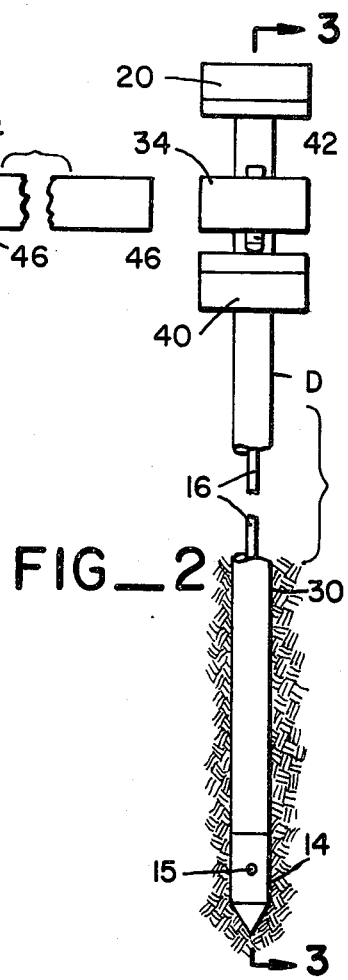
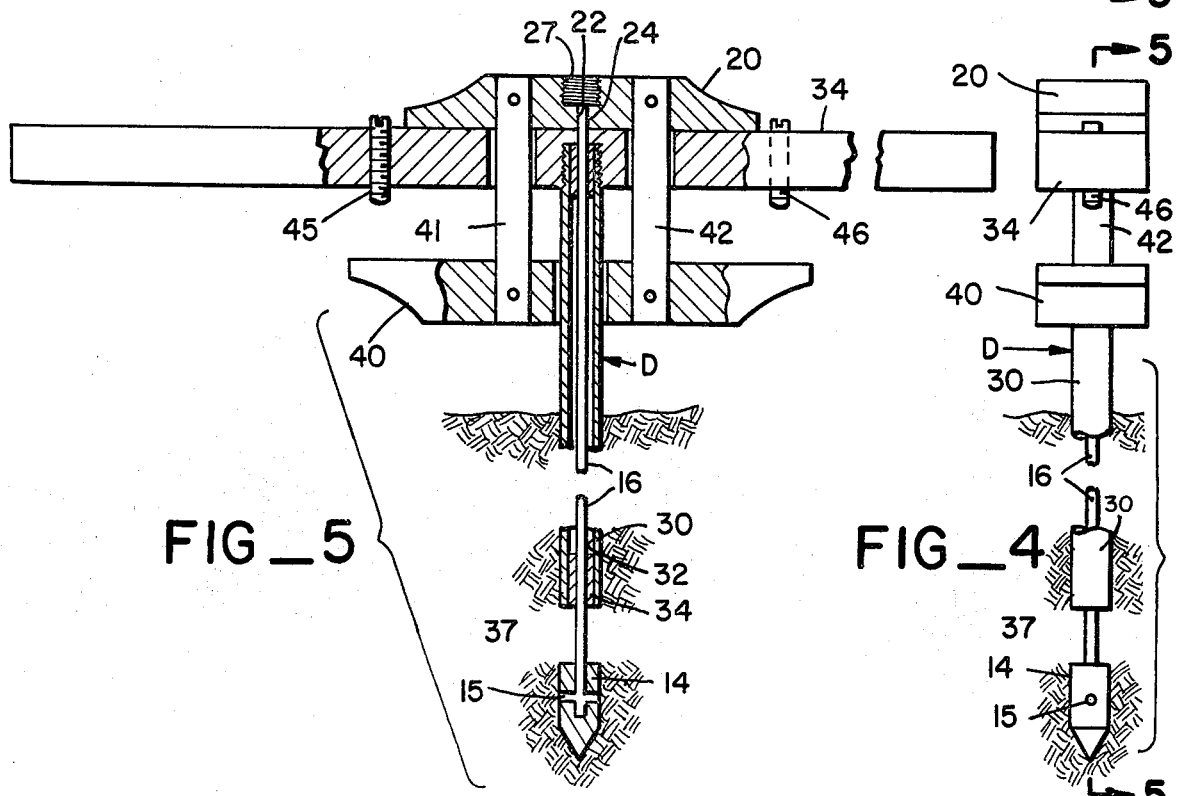
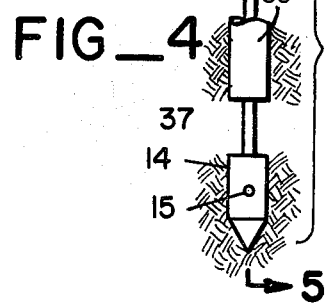
FIG_3　FIG_2　FIG_5　FIG_4

PROBE COLLECTOR FOR SUBTERRANEAN GASES

This invention relates to a subterranean probe for detecting gases. Specifically, a gas sampling probe is disclosed which can sample subterranean gases without excavation, such as those gases produced by natural putrefaction in surreptitious burial sites.

STATEMENT OF THE PROBLEM

It is often extremely useful to know the gaseous content of subterranean earth. The detection of surreptitious burial sites is one example. Natural putrefaction of bodies in such surreptitious burial sites produces an abnormal combustible gaseous content in the soil. Gases such as hydrogen sulfide, hydrogen phosphide, carbon dioxide, hydrogen, and methane are produced in liberal quantities. These gases, if sampled at subterranean levels, can indicate the presence of a suspected burial site. Time consuming excavation of large areas can be avoided.

Heretofore, it has not been possible to sample for gases in the soil without excavation. This has been because the insertions of probes have led to inevitable clogging of the probes. Moreover, the probes themselves are not designed to naturally enhance gaseous subterranean gas samples.

SUMMARY OF THE INVENTION

A gas probe for penetrating the earth to sample the gaseous output from earth, such as gases of putrefaction in a suspected burial area, is disclosed. A preferably cylindrical sampling conduit extends from a gas meter outlet at the top of the probe to a sampling manifold having at least one outward radially exposed manifold opening at the bottom of the probe. The collection conduit is affixed to and trails at its lower end a pike of preferably larger cylindrical section, which pike is the earth piercing portion of the probe. The sampling manifold is concentrically surrounded by a reciprocating sleeve having lower sealing bushing and a cylindrical section preferably the same as the cylindrical section of the pike. During insertion of the probe, the reciprocating sleeve at the bushing is used to seal the sampling manifold as well as to confront and apply pressure to the pike to effect a driving force downwardly to cause insertion of the probe. When the probe is driven to its full depth, the reciprocating sleeve is reciprocally withdrawn to expose the sampling manifold at the lower end of the probe. Withdrawal of this sleeve defines a protected annulus which enables the radially disposed manifold openings to be exposed outwardly to the soil without direct contact to the adjacent soil and resultant clogging during sampling. Simultaneously, this withdrawal of the radial sleeve creates a gradually expanding volume which draws gases from the surrounding soil for sampling. Moreover, an annulus of earth separated from the openings of the sampling manifold is produced across which gases to be sampled can be drawn. The probe is particularly useful in verifying the presence or absence of a body in a suspected surreptitious burial site without excavation.

The method employs the above described probe, whereby the probe provides a chamber into which gases are drawn, which may then be withdrawn from the chamber and analyzed.

OBJECTS AND ADVANTAGES OF THE INVENTION

It is an object of this invention to provide an apparatus for underground gas sampling in soil which is not saturated by water. According to this aspect, a sampling conduit is fastened to the trailing end of a pike. Immediately above the pike, the conduit includes a manifold with at least one radially protruding sampling aperture. A reciprocating sleeve covers the manifold apertures during insertion and reciprocates away from the pike during sampling to define open ports within the earth for receiving gas samples.

An advantage of this apparatus is that gases within the earth can be sampled without requiring excavation. For example, those gases produced by the natural putrefaction of buried animate objects —such as a corpse— can be detected. Areas where investigative excavation should occur can be located with precision.

Another advantage of the sampling manifold according to this invention is that it cannot become clogged during insertion. As the apertures of the sampling manifold are sealed during insertion and only open during sampling, obstruction of these sampling apertures is not dependent upon insertion.

An additional advantage of the reciprocating sleeve is that it can apply pressure to the earth piercing pike sufficient to drive the pike downwardly into the ground. The sampling conduit can be constructed to a small dimension for more efficient sampling while the considerable force required for driving the pike and trailing conduit into the ground is exerted through the larger and stronger sleeve.

A further advantage of this invention is that the unit is sealed during insertion. The probe need only be opened for the acceptance of gaseous samples at its intended depth.

Yet another advantage of this invention is that gas samples can be taken of soil strata at varying elevations from the ground surface. Not only can the location of desired excavation be determined, but the elevation at which gross excavation ceases and more careful excavation commences can be easily determined.

A further object of this invention is to disclose an underground sampling manifold with its individual sampling apertures exposed so that it is not readily capable of being plugged. According to this aspect, the sampling manifold follows a pike of larger diameter than the sampling manifold. When the covering sleeve is reciprocated to expose the sampling manifold apertures, a spatial annulus is defined around the sampling manifold, holding clogging during sampling to a minimum.

An advantage of this aspect of the invention is that the sampling apertures are not exposed in the direction of penetration of the probe. Rather, the apertures are exposed outwardly and to the side of the path of the probe into the earth.

Yet a further object of this invention is to disclose a sampling aperture which tends to draw from the surrounding soil the vapors to be sampled. According to this aspect, the protective sleeve covers the sampling manifold in following relation to the ground probing pike. When the reciprocating sleeve is drawn rearwardly to expose the sampling manifold, a gradually increasing annulus is defined proximate the sampling manifold.

An advantage of this gradually increasing annulus is that it tends to draw gases to be sampled from the adjacent soil during opening of the gas sampling manifold. Thus, the probe itself assists in the desired sampling function.

Other objects, features and advantages of this invention will become more apparent after referring to the following specification and attached drawings in which:

FIG. 1 is a side elevation section of the probe of this invention being utilized at a suspected burial site with a succession of probe dispositions being shown operatively connected to a conventional gas sampler;

FIG. 2 is a side elevation of the probe of this invention shown partially broken away along its length with the spike and manifold shown in the closed position for insertion of the probe into the earth;

FIG. 3 is a side elevation section of the probe of this invention taken along lines 3—3 of FIG. 2;

FIG. 4 is a side elevation of the probe of this invention shown open to the gas sampling position; and, FIG. 5 is a side elevation section of the probe of this invention along lines 5—5 of FIG. 4.

Referring to FIG. 1, body A is shown buried in a surreptitious burial site B identified by a surface depression C. The probe of this invention D is shown inserted into site B and connected to conventional gas sampling meter E. Typically, the probe will be inserted at a succession of elevations and locations at positions 10, 11 and 12. These positions will vary in both planar position and depth dependent upon the formation of the depression C, its depth, and the content of the gas samples taken.

Regarding the gas sampling apparatus E, one apparatus which is particularly useful for connection to the probe here shown is known as the Model 1148 Combination Dual Range Combustible Gas Indicator and Alarm/Temperature Surveyor, an instrument manufactured by the Johnson Instrument Division of Gastech, Inc., of Mountain View, California. It should be noted that in the use of this instrumentation, the ambient temperature of the sub-surface soil is important. As a practical matter, it is preferred that the sub-surface temperature of the soil be above freezing. Temperatures above 35° F are preferred. At temperatures of 45° or more, the gases to be detected form in comparatively large quantity and will be detected upon the least sensitive setting of the instrument here disclosed for a preferred use. It should be noted that the presence of bodies buried for ten years can be detected with this equipment.

It should also be noted that virtually any gas detector capable of detecting gases of decomposition or putrefaction such as hydrogen sulfide, hydrogen phosphide, methane, carbon dioxide, ammonia or hydrogen can be used with this invention. Specifically, gas detectors sensitive to methane gases are preferred.

Referring to FIGS. 2 and 3, the construction of the instrument can first be set forth. Thereafter, the operation of the probe during its penetration into the earth will be explained. Finally, and with reference to FIGS. 4 and 5, the opening of the probe to obtain a subterranean gas sample will be explained.

Probe D includes pike 14 fastened to sampling conduit 16 by pin 15. Sampling conduit 16 extends upwardly the full length of the probe into upper handle 20. Preferably, handle 20 is medially tapped with an inside screw thread 22 to mate with thread 24 on the exterior of the upper end of sampling conduit 16.

Concentrically of handle 20 and overlying the sampling conduit 16, there is formed second tap 27 of a larger diameter. This tap is connected to the gas sampling conduit which leads to the gas sampling apparatus E shown in FIG. 1. Gas to be sampled passes from the interior of conduit 16 to the meter connected conduit and then to the sampling apparatus interior of the meter.

A sleeve 30 having inside diameter 32 forming a sliding fit over the outside diameter of sampling conduit 16 fits over the sampling conduit between pike 14 and a second handle member 34. Sleeve 30 includes inside bushing 34 at its lower end which bushing slides over and covers the gas sampling manifold 37 at the lower end of the probe.

It can be seen that the sleeve 30 has two discrete functions. First, during driving of pike 14 and its attached sampling conduit 16 into the ground, sleeve 30 applies the driving force to the pike relieving the sampling manifold 16 of any substantial driving pressures. With respect to this function, it can be noted that sleeve 30 preferably has a cylindrical diameter the same as the cylindrical diameter of pike 14 so as to present a constant cross-section to the earth being pierced.

Second, sleeve 30 at bushing 34 seals the manifold opening 37. Thus, during penetration of the probe D into the ground, the manifold is completely sealed and gases will not be introduced.

Sleeve 30 is fastened at its upper end to driving handle 34 at threads 38 on sleeve 30 to interior threaded aperture 39 in driving handle 34. Thus, downward pressure on handle 34 causes the sleeve to advance pike 14 downwardly and into the ground, pulling sampling conduit 16 behind the pike.

Upper handle 20 is connected to a lower handle 40 by paired yoke members 41, 42, both on either side of the axis of sampling conduit 16. Lower handle 40 is, in turn, mated for adjustable contact with driving handle 34 through paired screws 45, 46.

By adjusting the protrusion of screws 45, 46 below driving handle 34 to a preselected interval below the driving handle 34, two functions will occur. First, the driving handle 34 will push the sleeve 30 and pike 14 into the ground. Second, variable adjustment of the screws 45, 46 on the lower handle 40 will cause the sampling conduit 16 to move in a predetermined retarded relationship behind the advancement of the pike 14. Thus, it can be easily seen that the probe D can be inserted to its full intended depth.

Referring to FIGS. 4 and 5, the operation of this device to take a subterranean sample can be easily understood. Simply, driving handle 34 is moved upwardly from its juxtaposition with lower handle 40 into juxtaposition with the underside of upper handle 20. This causes sleeve 30 to retract or reciprocate upwardly so that interior bushing 34 uncovers the sampling manifold outlets 37 immediately trailing the pike 14.

Upon withdrawal of sleeve 30, substantially three functions occur. First, withdrawal of the sleeve defines a protected annulus which enables the radially disposed sampling apertures 37 to be exposed outwardly to the soil without direct contact to the soil. Resultant clogging during gas sampling is avoided insofar as possible.

Second, withdrawal of the radial sleeve creates a gradually expanding volume. This gradually expanding volume draws gases from the surrounding soil into the area adjacent manifold openings 37 to effect sampling.

Finally, and as sampling continues, an annulus of earth separated from the openings of the sampling manifold is produced. Gases to be sampled are drawn across this annulus and into the gas measurement apparatus.

When gas sampling has occurred at the desired depth, handle 34 is preferably pushed downwardly and into contact again with lower handle 40. This is the precise disposition illustrated in FIG. 3. Thereafter, the apparatus is removed from the ground by pulling upward at lower handle 40. During such movement, the cylinder 30 at bushing 34 closes the sampling manifold 37 to again prevent clogging of the manifold apertures during withdrawal of the probe from the ground.

It should be understood that the probe here used is suitable for use in earth above the existent water table only. The gaseous content of soil from below the water table will percolate upwardly above the water table to an area wherein the probe here disclosed has utility. It should be understood that the gas sampling function of the probe is not intended for use below an existent water table.

The method involves introducing a probe, conveniently having a pike which aids in the penetration of the earth by the probe into the earth in an area suspected of being above a putrefying body. Located internally of the probe near the bottom is a gas sampling orifice surrounded by a reciprocating sleeve. The probe is introduced into the earth forming a channel, the reciprocating sleeve partially withdrawn, forming a chamber with a pressure gradient between the chamber and the surrounding earth, so as to draw vapors into the chamber and the vapors are withdrawn through the gas sampling opening and analyzed for gases of putrefaction, particularly two gases, normally one of which is methane and another is either hydrogen sulfide, hydrogen phosphide (phosphine), carbon dioxide or hydrogen. One can obtain comparative values of the normal presence of these gases in the earth by sampling areas in the vicinity of but remote from the area of the putrefying body.

It will be understood that the invention herein could admit of a number of modifications. For example, many different configurations of actuating handles can be used with this invention, providing that the reciprocating function of the sleeves, sampling manifold, and pike are all provided for. While the particular configuration herein is preferred, others providing the crucial function to the pike 14, sampling manifold 16, and sealing bushing 34 may be used. Likewise, other modifications can occur without departing from the spirit and scope of this invention.

I claim:

1. A method for detecting the presence of a putrefying subterranean body which comprises: introducing into a site of a burial area suspected of containing a petrefying body a probe downwardly into the ground; providing an internal gas receiving opening near the bottom of said probe plugged by a protecting member; withdrawing said member to expose said opening to a chamber caused by removing said member to draw vapors into said probe withdrawing vapors through said opening to a gas analyzer; and, analyzing said vapor for at least one gas selected from the group consisting of methane, hydrogen sulfide, hydrogen phosphide, carbon dioxide and hydrogen.

2. A method according to claim 1, where one of said gases is hydrocarbons.

* * * * *